United States Patent Office 3,444,648
Patented May 20, 1969

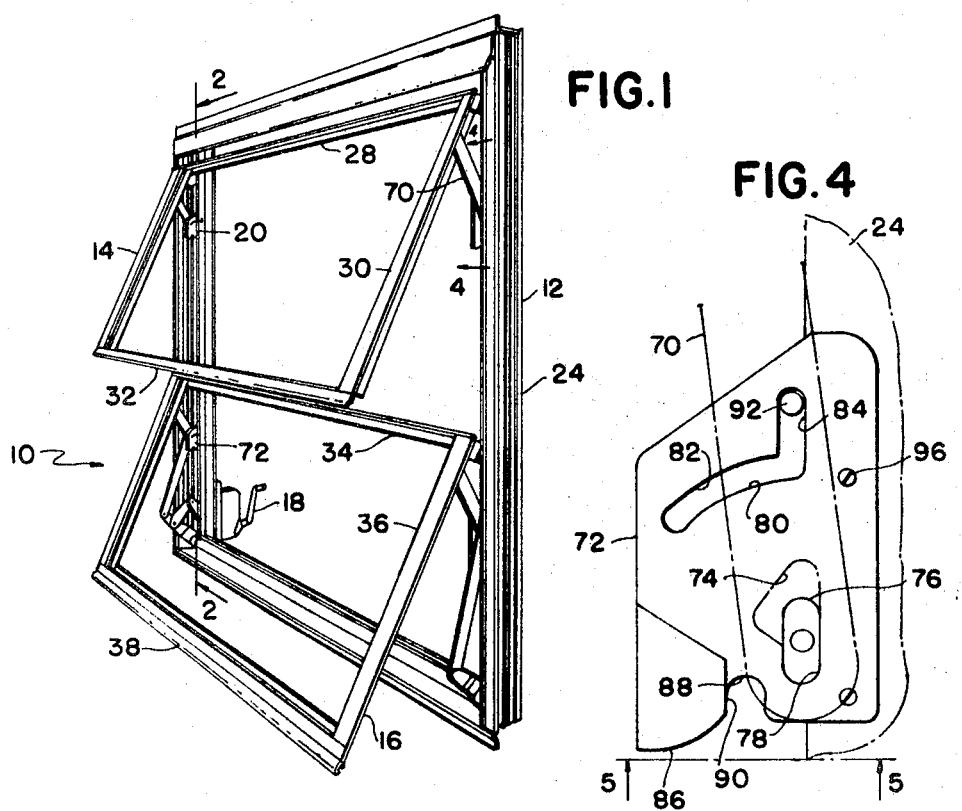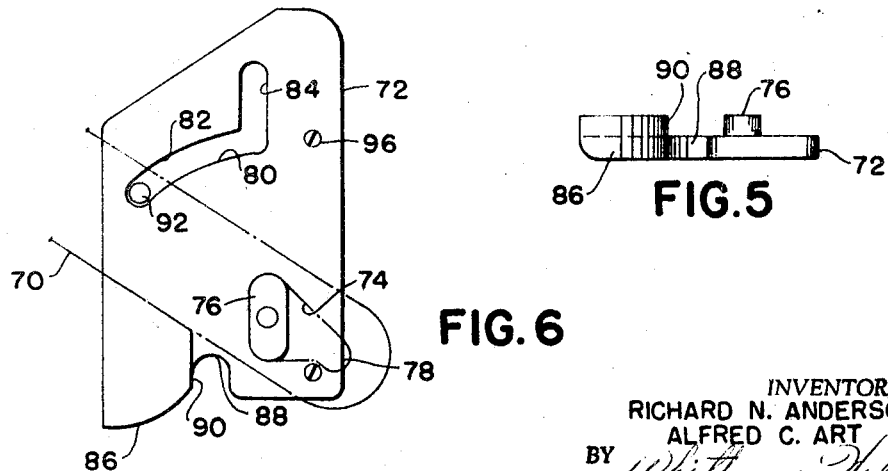

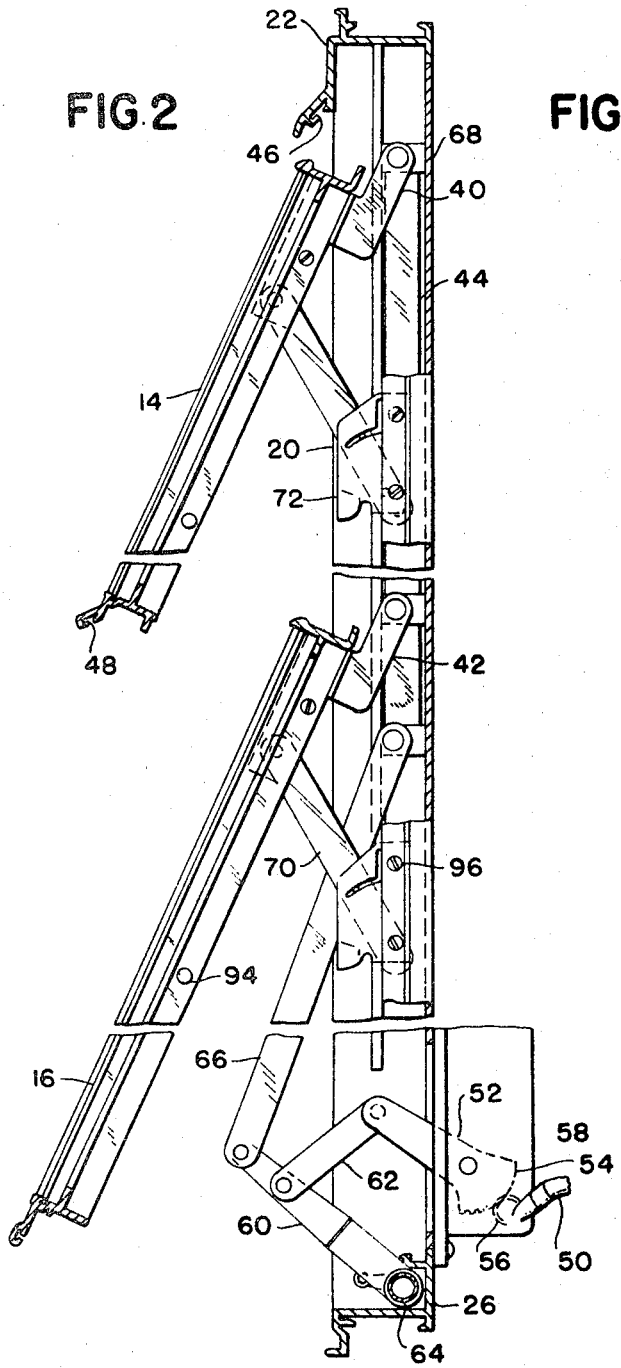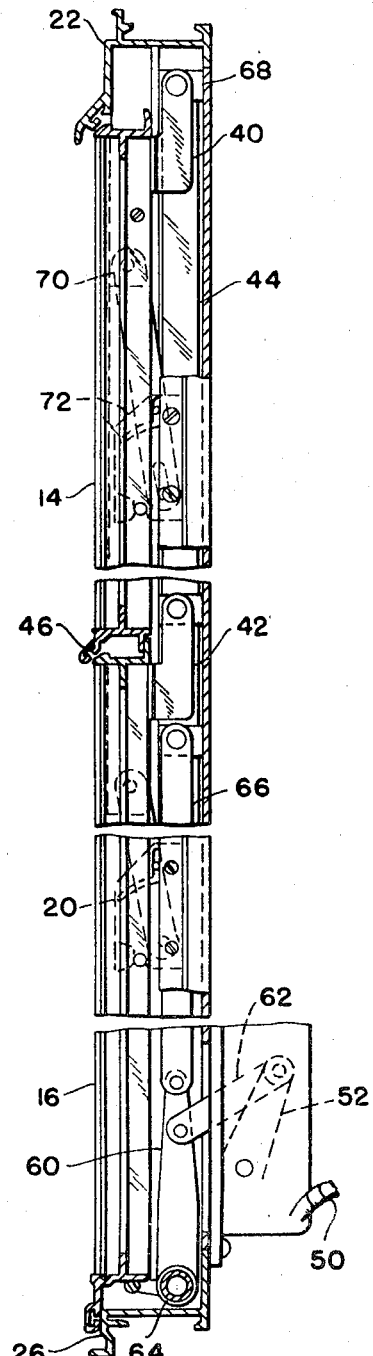

3,444,648
BUILDING STRUCTURE
Richard N. Anderson, Rome, Ga., and Alfred C. Art, Holmes Beach, Fla., assignors to V. E. Anderson Mfg. Co., Owensboro, Ky., a corporation of Kentucky
Filed June 6, 1966, Ser. No. 555,475
Int. Cl. E05c 17/04; E05d 15/46
U.S. Cl. 49—248                 3 Claims

ABSTRACT OF THE DISCLOSURE

Guiding and locking means for awning windows comprising an integral locking and guiding member secured to the frame of the awning window having a guiding slot therein and a camming surface thereon terminating in a locking abutment, a guiding stud secured to a vent link movable within the guiding slot and a cam follower and locking stud secured to the window vent engageable with the camming surface and the locking abutment. The combination guiding and locking member is a single piece and further includes means for pivotally mounting the vent link. The guiding slot includes an arcuate portion extending upwardly inwardly of the window structure terminating in a vertically extending portion. The camming surface extends upwardly inwardly of the window and terminates in the locking abutment extending vertically upwardly.

---

In the past many awning windows have not included automatic locking structure whereby on closing of the window the window is locked in a closed position. Such windows either require manual separate locking devices or are not burglar proof. Wherein automatic structure for locking awning windows in a closed position has been provided in the past, such structure has usually been complicated and expensive to produce and maintain and has often been inefficient.

It is therefore one of the objects of the present invention to provide improved locking awning window structure.

Another object is to provide locking awning window structure including a frame, a vent and at least one vent link, locking means operable between two of the frame, vent and vent link to secure the vent in a closed position relative to the frame and guide means operable between two others of the vent, frame and vent link for guiding the vent into a fully closed position before locking of the vent can be accomplished.

Another object is to provide locking awning window structure as set forth above wherein the locking means is operable between the frame and vent.

Another object is to provide locking awning window structure as set forth above wherein the guide means is operable between the vent link and frame.

Another object is to provide locking awning window structure as set forth above wherein the locking means and guide means include a common locking and guiding member having a camming and locking surface thereon and a camming and guiding slot therein operable in conjunction with a locking stud on the vent and a guiding stud on the vent link.

Another object is to provide locking awning window structure which is simple in construction, economical to produce and efficient in use.

Other objects and features of the invention will become apparent as the description proceeds, especially when taken in conjunction with the accompanying drawings, illustrating a preferred embodiment of the invention, wherein:

FIGURE 1 is a perspective view of a locking awning window constructed in accordance with the invention.

FIGURE 2 is an enlarged, broken, longitudinal section view of the locking awning window structure illustrated in FIGURE 1 taken substantially on the line 2—2 in FIGURE 1 and showing the window in an open position.

FIGURE 3 is an enlarged, broken, longitudinal section view of the locking awning window structure illustrated in FIGURE 1 taken substantially on the line 2—2 in FIGURE 1 and showing the window in a closed position.

FIGURE 4 is an enlarged view of the locking and guiding member of the window illustrated in FIGURE 1 taken substantially on the line 4—4 in FIGURE 1 and showing the vent link in phantom in a closed position.

FIGURE 5 is a bottom view of the locking and guiding member of the window of FIGURE 1 taken in the direction of line 5—5 in FIGURE 4.

FIGURE 6 is an enlarged view of the locking and guiding member of the window illustrated in FIGURE 1 similar to the view of FIGURE 4 but showing the vent link in an open position.

With particular reference to the figures of the drawings, one embodiment of the present invention will now be disclosed in detail.

As shown best in FIGURE 1, the locking awning window structure 10 includes the frame 12, vents 14 and 16 and actuating structure 18. Guiding and locking structure 20 is provided at each side of each of the vents 14 and 16, as shown in FIGURE 1.

In operation, the actuating structure 18 is operated to move the window vents 14 and 16 into open or closed positions. The guiding and locking structure 20 first guides the vents 14 and 16 into a closed position without permitting locking of the vents and after the vents are moved into the closed position locks the vents in the closed position on further operation of the actuating structure.

More specifically the frame 12 includes frame head, jamb and still members 22, 24 and 26, as shown best in FIGURES 2 and 3. The head, jamb and still members are secured together by convenient corner brackets (not shown) to form a rectangular frame adapted to fit within an opening in a building structure or the like in the usual manner.

Similarly the vents 14 and 16 include vent head, jamb and still members 28, 30 and 32 and 34, 36 and 38, respectively. The vent hinge members 40 and 42 are provided to pivotally secure the upper ends of the jamb members 30 and 32 to the draw bar 44 of the actuating structure 18.

Suitable closure material, such as glass (not shown) may be provided in the vents 14 and 16. Sealing material, such as plastic sealing tubes, may be secured to the frame and vents where desired around the vents by, for example, the T-shaped recesses 46 and 48 in the frame and vents.

The actuating structure 18 includes the crank 50 and lever 52 having a toothed sector 54 on one end thereof engageable with an actuating pinion 56 operated by the crank 50 which is pivotally mounted at 58. The lever 52 is connected to a cross shaft arm 60 by means of an actuating link 62 extending between the lever 52 and cross shaft arm 60 and pivoted thereto at the opposite ends thereof. A cross shaft 64 is rotatably held between the frame jambs 24 at the bottom thereof to which cross shaft arms 60 are secured at each end. The cross shaft 64 transfers torque from cross shaft arm 60 on one side of the window structure 10 to the cross shaft arm on the other side thereof.

The cross shaft arms 60 are pivotally secured at the end thereof remote from the cross shaft to one end of pull-down arms 66 at the opposite sides of the window structure 10 which pull-down arms 66 are pivotally secured at the other end to draw bars 44, again at the opposite sides of the window 10. The draw bars 44 are guided in vertical movement within the frame jambs 24 from which they are separated by plastic bearings 68. The actuating structure 18 is completed by the vent links 70 pivotally secured to the jambs of the vents 14 and 16 at the opposite sides thereof at one end and pivotally secured to the guiding and locking member 72 of the guiding and locking structure 20 at the other end.

The pivotal connection between the vent links 70 and the guiding and locking members 72, as best shown in FIGURES 4 and 6, comprises a generally triangular opening 74 in one end of the vent links 70 for receiving an elongated camming abutment 76 of the guiding and locking member 72 with the links 70 and guiding and locking members 72 in various angular relations. An additional pocket 78 is provided at one corner of the triangular opening 74 through the links 70 for receiving the abutment 76 on the guiding and locking member 72 to permit relative linear movement between the links 70 and the abutment 76 with the link 70 and guiding and locking member 72 in one angular position thereof, that is, when the link 70 is in a position assumed thereby when the vent associated therewith is closed.

The guiding and locking structure 20 includes the guiding and locking member 72 having the abutment 76 and the slot 80 therein secured to frame jambs 24, as by screws 96 at each side of each vent. Slot 80 includes an arcuate portion 82 terminating in a linear portion 84 extending vertically of the window structure 10. The guiding and locking member further includes the cam surface 86 on the bottom thereof terminating in a recess 88 providing a locking abutment 90 and the arcuate edge 87 for camming the vents horizontally into proper position between the frame jambs on closing thereof.

The slot 80 receives a guide stud 92 on the links 70 for guiding the links 70 first in arcuate movement about the pivot structure for the links, including the opening 74 and the stud 76, and then permitting vertical movement of the link 70 with respect to the guiding and locking member 72 whereby the abutment 76 moves linearly of the link 70 into the pocket 78. The camming surface 86, recess 88 and abutment 90 cooperate with locking studs 94 on the vent jambs to lock the vents in a closed position on upward movement of the links 70 after the vents 14 and 16 are closed. The guide studs 92 and locking studs 94 complete the guiding and locking structure 20.

Thus, in operation, assuming that the events 14 and 16 are in an open position, as shown for example in FIGURES 1 and 2, the crank 50, as shown in FIGURE 2, is rotated to pivot the levers 52 clockwise about their pivot mountings 58 whereby the cross shaft arms 60 and cross shaft are moved in a clockwise direction about the axis of the cross shaft. The pull-down arms 66 at each side of the window 10 are thus caused to move vertically upwardly and inwardly at the bottom to force the drawbars 44 upwardly at both sides of the window structure 10. The links 70 are thus caused to pivot in a clockwise direction and the vents 14 and 16 are moved into a closed position with the cam surfaces 87 horizontally centering the vents.

The links 70 are prevented from moving up before the vents 14 and 16 are in a closed position due to the guiding of the guide studs 92 in the arcuate portions 82 of the slots 80 in the guiding and locking members 72. On clockwise pivotal movement of the links 70, the pivot abutment 76 is aligned with the pocket 78 of the opening 74 through the links 70 when the vents 14 and 16 are in a closed position. Further upward movement of the drawbar 44 after the vents 14 and 16 are in a closed position causes upward movement of the vents 14 and 16 and the links 70 relative to the frame 12, whereby the guide studs 92 proceed upwardly in the linear portions 84 of the guide slots 80. At the same time the pivot abutments 76 of the guiding and locking members 72 move into the pockets 78 in the links 70.

During the upward movement of the vents 14 and 16 the locking studs 94 carried by the vents 14 and 16 are cammed along the surface 86 of the guiding and locking members 72, if necessary, into the recess 88. With the vents 14 and 16 in a fully up position the locking studs 94 engage the locking abutments 90 to prevent outward pivotal movement of the vents 14 and 16 whereby the vents 14 and 16 are automatically locked in place on normal closing of the window structure 10.

Thus it will be seen that in accordance with the invention a particularly simple, economical and efficient locking awning window has been provided. For example, making the guiding and locking members 72 of a material, such as nylon, removes the need for plastic sleeves around the guide studs 92 and pivot abutments 76 which would increase the assembly difficulty and expense of the guiding and locking structure. Further, the elongated nature of the pivot abutment reduces lost motion in the guiding and locking structure to increase the efficiency thereof.

While one embodiment of the present invention has been disclosed in detail, it will be understood that other embodiments and modifications are contemplated. It is the intention to include all embodiments and modifications of the invention as are defined by the appended claims within the scope of the invention.

What we claim as our invention is:

1. Locking awning window structure comprising a generally rectangular frame, at least one vent, means for pivotally mounting the vent within the frame, structure including at least one vent link operable between the vent and frame for pivoting the vent into and out of open and closed positions with respect to the frame, locking and guiding means for securing said vent in a closed position relative to said frame on closing of said vent and for insuring said vent is in a closed position before locking thereof, including a one piece member secured to the frame having a lower camming and abutment surface thereon which includes a portion extending convex downwardly, inwardly of the window structure and a portion extending vertically upwardly from the inner end of the convex portion and a camming and guiding slot therein spaced vertically upwardly from the camming and abutment surface, including an arcuate upwardly convex portion extending upwardly, inwardly of the window structure and a vertical portion extending upwardly from the inner end of the convex portion, a locking stud secured to the vent engageable with the camming and locking abutment surface, a cam follower guiding stud secured to the link and extending within the camming and guiding slot and means for securing one end of the link to the one piece member for vertical movement and subsequent pivotal movement of the link on opening of the vent.

2. Structure as set forth in claim 1 wherein the means for securing the one end of the link to the one piece member includes a vertically elongated pivot abutment on the one piece member and an opening in the one end of the link extending vertically a distance greater than the vertical dimension of the pivot abutment and including a portion extending outwardly of the window structure shaped to permit pivotal movement of the link outwardly of the window structure with the pivot abutment at the top of the opening in the one end of the link.

3. Structure as set forth in claim 1 wherein the locking and guiding means are provided on both sides of the vent.

References Cited
UNITED STATES PATENTS

| | | | |
|---|---|---|---|
| 2,709,582 | 5/1955 | Chapman | 49—81 |
| 3,030,671 | 4/1962 | Jones | 49—81 |
| 3,197,818 | 8/1965 | Sargent et al. | 49—248 |
| 3,230,586 | 1/1966 | Smith et al. | 49—81 |

KENNETH DOWNEY, *Primary Examiner.*

U.S. Cl. X.R.

49—394